UNITED STATES PATENT OFFICE.

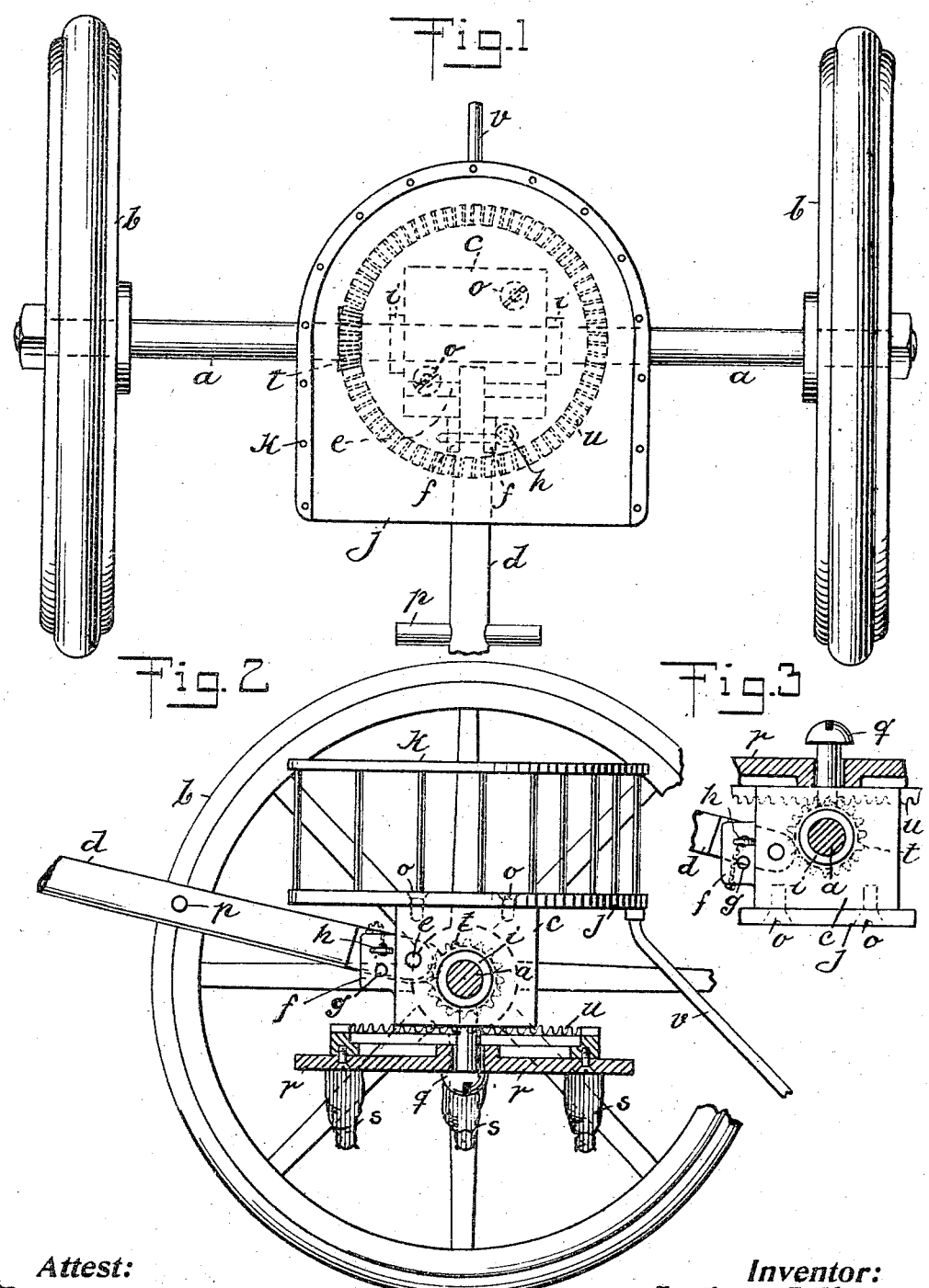

ANDREW B. FOANS, OF NEW YORK, N. Y.

WHEELED TOY.

1,235,455.      Specification of Letters Patent.      Patented July 31, 1917.

Application filed August 24, 1916. Serial No. 116,580.

*To all whom it may concern:*

Be it known that I, ANDREW B. FOANS, a citizen of the United States, residing at New York, in the county of New York and State of New York, have invented new and useful Improvements in Wheeled Toys, of which the following is a specification.

This invention relates to a combination toy and go-cart which is essentially provided with a turn table having figures or pictures thereon to amuse the children, and a platform located opposite the turn table suitable for supporting a child, doll, or any representation.

The fundamental object of the invention is to operate the turn table by the travel of a vehicle along the ground, or when it is desired to convert the device into a go-cart, the turn table is automatically disconnected from the driving devices and remains stationary.

The novel features of the invention are more fully described in the following specification and claims and illustrated in the accompanying drawing in which:—

Figure 1 represents a plan view of a device embodying this invention.

Fig. 2 is a side elevation showing one of the wheels removed.

Fig. 3 is a detail view of the block and gear.

In this drawing the letter $a$ designates an axle or shaft on each end of which is firmly secured a rubber tired wheel $b$ suitable for traveling on the ground to actuate the axle. At the center of the axle is mounted a block $c$ having a handle $d$ secured to the block by a pin $e$ inserted through a hole in the block. Lugs $f$ project from the side of the block and they have holes $g$ either one being for the insertion of a pin $h$ to hold the handle in an inclined position. In other words when reversing or inverting the device the inclination of the handle can be changed by removing the pin $h$ to engage the other hole, thus resetting the handle at the proper angle. Stops $i$ prevent lateral movement of the block relative to the axle.

On the block is secured a platform $j$ having arm rests $k$, said platform to be used to ride a child manikin or any other object. This platform is rigidly fastened to the block by screws $o$ passing through holes in the platform and engaging the block. The handle is provided with rungs $p$ projecting from each side of it for supporting the feet of a child.

On the opposite portion of the block is slidingly mounted on a bolt $q$ a turn table or skeleton frame $r$ adapted to carry a number of objects $s$ such as animals or manikins. A pinion $t$ fastened to the axle is adapted at predetermined times to engage a gear $u$ fastened to the turn table. It will be readily understood that when the device is employed to carry a child the seat or platform will be in the position indicated in Figs. 1 and 2, the gear $u$ having slid downward along the bolt $q$ until stopped by the head of the bolt, hence holding the gear out of engagement with the pinion $t$ on the axle.

When it is desired to utilize the device for the amusement of children the block is turned about the axle as indicated in Fig. 3; the turn table with the gear $u$ will then gravitate downward, and the gear will engage the driving pinion $t$ to rotate the turn table. The handle can then be set at a different angle relative to the lugs or platform to give the proper inclination. As shown in the drawing the rear of the seat has a prop $v$ to coact with the ground when the seat is tilted too far backward. The wheels $b$ being fast on the axle when traveling along the ground, will drive the pinion thereby transmitting rotary motion to the turn table.

It will be, of course, understood that various changes may be made in the details of construction. For instance, the beveled gears could be put on the inside of one wheel for engagement with a gear on the edge of the turn table or any frictional device may be used.

What I lay claim to broadly is the combination of a child's go-cart and toy, the toy being operated either by the wheels or the axle and when the vehicle is reversed for the purpose of using it as a go-cart or carriage, the devices for rotating the table will be out of engagement.

I claim:

1. The combination with a vehicle having an axle provided with a gear driven by the travel of the vehicle, of a turn table having a gear for engagement with the axle gear, means for rotatively and slidingly mounting the turn table gear on the axle, the latter gear being adapted to be brought into and out of engagement with the axle gear by positioning the same above or below the axle.

2. The combination with a vehicle having an axle provided with a pinion driven by the wheels of the vehicle, of a block mounted on the axle, a platform secured to the block, a turn table rotatively and slidingly mounted on the block opposite the platform, a gear secured to the turn table for engagement with the pinion, said gear being adapted by the inverted movement of the block to gravitate out of engagement with the pinion.

3. The combination with a vehicle having an axle provided with a pinion driven by the wheels of the vehicle, of a block mounted on the axle, a platform secured to the block, a turn table rotatively and slidingly mounted on the block opposite the platform, a gear secured to the turn table for engagement with the pinion, said gear being adapted by the reverse movement of the block to gravitate out of engagement with the pinion, a handle pivoted to the block and means for positioning the handle at different angles.

In testimony whereof I have hereunto set my hand in the presence of two subscribing witnesses.

ANDREW B. FOANS.

Witnesses:
WILLIAM MILLER,
WM. E. WARLAND.

Copies of this patent may be obtained for five cents each, by addressing the "Commissioner of Patents, Washington, D. C."